United States Patent
Williams

[11] 3,777,720
[45] Dec. 11, 1973

[54] ROTARY INTERNAL COMBUSTION ENGINE

[76] Inventor: Robert H. Williams, Rt. 2, Bandera, Tex. 78003

[22] Filed: Jan. 7, 1972

[21] Appl. No.: 216,153

[52] U.S. Cl. .............................. 123/8.09, 123/8.45
[51] Int. Cl. .......................................... F02b 53/12
[58] Field of Search ................ 123/8.07, 8.09, 8.13, 123/8.45

[56] References Cited
UNITED STATES PATENTS

| | | | |
|---|---|---|---|
| 3,699,929 | 10/1972 | Bennethum | 123/8.09 |
| 3,314,401 | 4/1967 | Kell | 123/8.45 |
| 3,690,791 | 9/1972 | Dieter | 123/8.45 |
| 1,147,428 | 7/1915 | Peterson | 123/8.09 X |
| 1,812,729 | 6/1931 | Teeters | 123/8.07 |
| 2,988,065 | 6/1961 | Wankel | 123/8.45 |
| 3,391,677 | 7/1968 | Hejj | 123/8.13 UX |

*Primary Examiner*—Clarence R. Gordon
*Attorney*—Dana E. Keech

[57] ABSTRACT

An outer hollow body provides a two lobed epitrochoidal cavity within which a three-lobed piston revolves to form a series of separate sealed working chambers, each of which progressively expands and contacts during each rotor revolution, the present engine dividing each chamber, as it approaches a condition of maximum contraction, into leading and trailing portions and delivering a pre-compressed fuel charge into said leading portion and igniting the same while said working chamber is still so divided, the power impulse thus produced being directed principally along lines lying in advance of the center of rotation of said rotor, and thus applying torque to said rotor.

3 Claims, 2 Drawing Figures

ROTARY INTERNAL COMBUSTION ENGINE

SUMMARY OF THE INVENTION

This invention is an improvement of that general type of internal combustion engine known as the "Wankel Rotary," the latter being disclosed and claimed in U.S. Pat. No. 2,988,065 which issued on June 13, 1961 to Felix Wankel and Ernest Hoeppner of Lindau, Germany.

In each power impulse, the Wankel Rotary balances the pressure applied inwardly to the rotor equally over the entire area between an adjacent pair of rotor apices. This decreases the net forward torque applied to the rotor by each power impulse.

It is a primary another object of the invention to provide an improved Wankel Rotary in which the pressure is focused on a forward portion of the aforesaid area in each power impulse, thereby substantially increasing the power imparted to the rotor in each impulse.

BRIEF DESCRIPTION OF THE DRAWINGS

Several modifications of the Wankel Rotary are shown in said Wankel patent and for purposes of exemplification, the improved Wankel Rotary illustrated in the present application adopts the general style of engine shown in FIGS. 15 and 16 of the Wankel patent.

DETAILED DESCRIPTION OF THE PREFERRED EMBODIMENT

Figure 1:
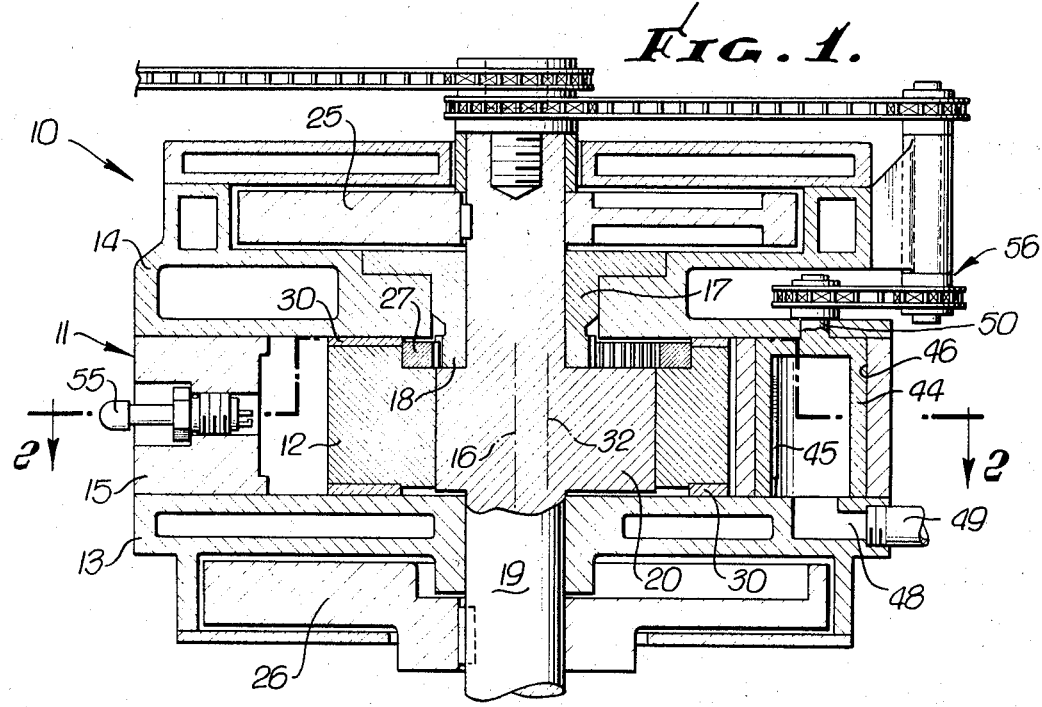
FIG. 1 of the drawings in this application is a vertical axial sectional view of the invention and is taken on the line 1—1 of FIG. 2.

Referring specifically to the drawings, the invention is shown therein as embodied in an improved rotary internal combustion engine 10 which embraces a housing 11, this being the outer body of the engine and a rotor 12 which is the inner body of the engine.

The housing includes two axially spaced end walls 13 and 14. These end walls are interconnected by a peripheral wall or shell 15, the inner contour of which is in the form of a two-lobed epitrochoid. The axis of the housing 11 is indicated at 16. The end wall 14 is provided with an aperture within which is fixed a bearing 17 on which is formed an externally toothed gear 18. The other end wall 13 is provided with a journalling aperture of the same diameter as that of bearing 17. Within these apertures is journaled a shaft 19 which carries an eccentric 20. The rotor 12 is mounted to turn on this eccentric. To counterbalance the eccentric 20 and rotor 12, suitable counterweights 25 and 26 are keyed to opposite end portions of shaft 19.

Recessed into eccentric 20 and rotor 12 in the plane of the externally toothed gear 18 is an internally toothed ring gear 27 the pitch diameter of which is the same as the diameter of said eccentric, said ring gear meshing with the externally toothed gear 18 thereby imparting a predetermined planetary movement to the rotor 12 as the shaft 19 revolves in said bearings. As shown by the arrows in FIG. 2, the rotor 12 and shaft 19 and eccentric 20 all turn in a counterclockwise direction in the specific engine design illustrated in the drawings.

Since the internal contour of the housing 11 has the shape of a two-lobed epitrochoid, the rotor 12 is of generally triangular configuration and has three apex portions 28 at which are mounted edge seal means 29. Suitable end means 30 are also carried by opposite ends of the rotor 12. The edge seal means 29 make continuous sliding contact with the inner periphery 31 of the peripheral wall 15 during the planetary movement of rotor 12. The gear ratio of the planetary gears 18 and 27 is 3:2 so that for every two revolutions of the rotor 12 about its own axis, the shaft 19 (and the eccentric 20) rotates three times in the same direction.

Figure 2:
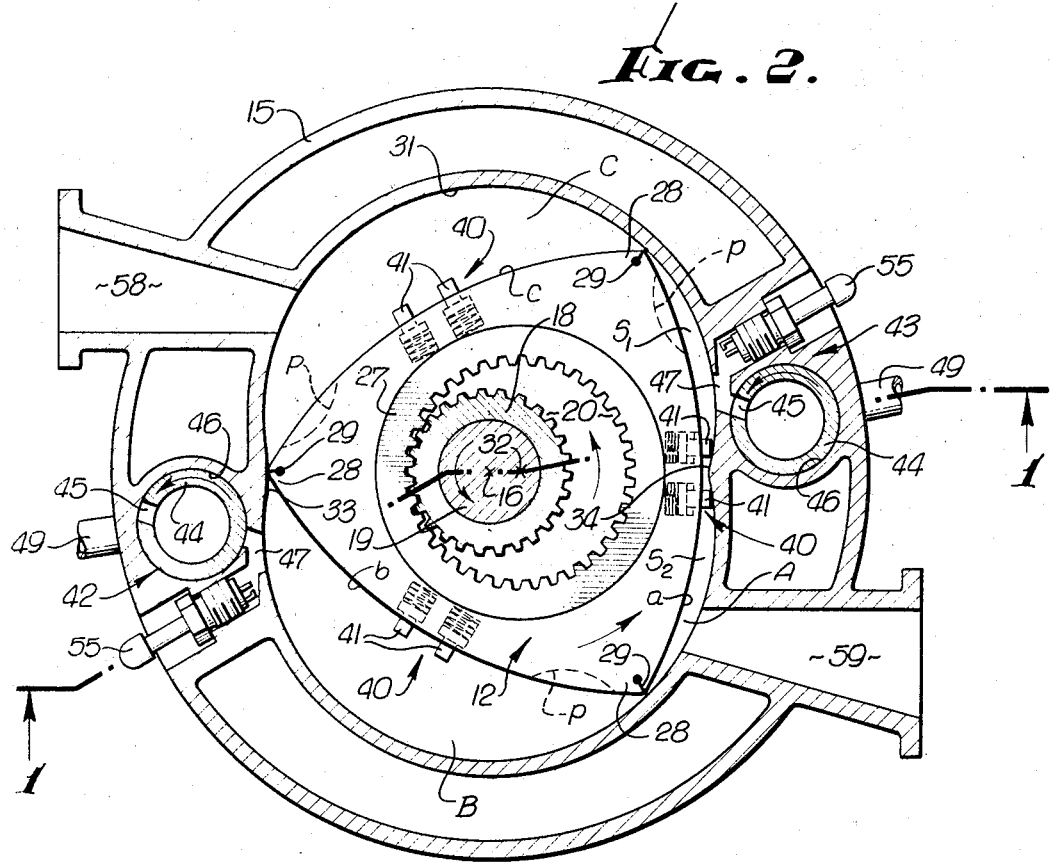
FIG. 2 is a cross-sectional view of the invention taken on the line 2—2 of FIG. 1.

As shown in FIG. 2, the rotor apex portions 28 are maintained in closely juxtaposed relation with the inner periphery 31 of the outer body 11 so that the edge seal means 29 maintain a practical sealing relation between said apex portions and said inner periphery for all positions of the rotor 12 during its planetary movement within the outer body as above described. Throughout this planetary motion of the rotor 12, the latter rotates about its own axis 32 which is the rotational axis between the rotor and the eccentric 20 on which the rotor is mounted.

As above described, the inner periphery 31 has two lobes 33 and 34 comprising the diametrically opposed portions of said inner periphery of minimum radius.

The rotor 12 thus at all times divides the space within the outer body 11, and located between the rotor 12 and said outer body, into three operating chambers which for convenience are designated as chambers A, B and C. The size and volume of each of these chambers constantly is changing between a condition of maximum contraction, in which chamber A is shown in FIG. 2, and a condition of maximum expansion, which chamber C has just passed through.

The engine 10 is optionally provided with auxiliary seal means 40 mounted in a central location in each of the convex side walls $a$, $b$ and $c$ of the rotor 12 so that this means comes into engagement with each of the lobes 33 and 34 as said seal means passes said lobe so as to divide the adjacent working chamber, momentarily subjected to a maximum contraction, into two momentarily separate subchambers $S_1$ and $S_2$. Each of the auxiliary seal means 40 may include one or more individual narrow sealing vanes 41 which are slideable and spring loaded outwardly a relatively short distance, the function of these sealing vanes being limited to making momentary sealing engagement with the inner periphery 31 of the outer body 11 in the areas occupied by the lobes 33 and 34.

The object of dividing each of the working chambers when thus contracted and approximately symmetrically related to one of the lobes 33 or 34, and the division of this chamber into subchambers $S_1$ and $S_2$, is to enhance the effect produced by each power impulse of the engine. When a fuel charge is ignited in a working chamber in the Wankel Rotary (not restricted as in the working chamber A for instance) the fuel charge occupies all portions of the working chamber and when it is ignited the extreme pressures produced apply to the entire working chamber from one end to the other. Although the portion of this chamber disposed rearwardly from lobe 34 in the Wankel Rotary is rapidly diminishing in volume due to the rotation of the rotor, nevertheless the extension of the fuel and the gases of combustion produced by their explosion throughout the entire length of the working chamber introduces retarding forces decreasing the efficient use of fuel in the engine.

In the engine 10, fuel-charge-delivery-and-ignition heads 42 and 43 are embodied in the peripheral wall 15 of the engine at locations just following the locations respectively of the lobes 33 and 34 and are actuated in timed relation with the rotation of the shaft 19 of the engine 10 so that a fuel charge is thus delivered into each subchamber $S_1$ as it is formed and, immediately after such delivery, is ignited so as to produce a power impulse in the engine which rotates the rotor 12 in a counterclockwise direction. Each of the heads 42 and 43 includes a sleeve valve 44 having a fuel delivery slot 45, said valve being rotatably mounted in a bore 46 formed in wall 15, said slot connecting with the inner periphery 31 of the outer body 11 through a fuel charge delivery port 47 with which the slot 45 is shown aligned in head 43 in FIG. 2. Compressed fuel is delivered to an open end of each sleeve valve 44 through a passage 48 cored in the end wall 13 and which is connected by a pipe 49 with a suitable storage tank for compressed gaseous fuel (not shown) which is provided with suitable means driven by the engine 10 for maintaining a predetermined pressure at all times in said tank.

Each sleeve valve 44 has an axial end trunion 50 through which said valve is driven in timed relation with shaft 19 through a chain and sprocket mechanism 56 which is connected with said shaft so that said sleeve valves are continuously rotated in a 2-1 ratio with said shaft.

Each of the fuel charge delivery and ignition heads 42 and 43 has a spark plug 55, the spark forming electrodes of which project into close proximity with the fuel delivery slot 45 of said head, these spark plugs being energized in proper timing with the delivery of fuel charges so as to ignite each charge just as soon as the delivery of the charge has been completed and the sleeve valve 44 delivering the same has turned to closed position.

Exhaust ports 58 and 59 are provided in peripheral wall 15 for the exhaust of gases of combustion from each of the working chambers A, B and C at the conclusion of a power impulse in the latter. In FIG. 2, working chamber A is in position for receiving a charge of fuel. Immediately following this position, as the sleeve valve 44 of the fuel delivery and ignition head 43 closes, spark plug 55 of that head will ignite that charge which at that time is confined entirely to subchamber $S_1$. The power impulse following will therefore be delivered exclusively to the portion of surface $a$ of rotor 12 which is exposed to subchamber $S_1$.

Working chamber B is shown towards the close of a power impulse with the sleeve valve 44 of fuel-charge-delivery-and-ignition head 42 rotated to a 180° out of phase position. As the power impulse gets under way in working chamber A, working chamber B, of course, will move into alignment with exhaust port 59 and gases of combustion will be delivered from this chamber outwardly through said port.

Working chamber C is in the middle of its exhausting phase with gases of combustion pouring therefrom through exhaust port 58. The next power impulse will occur in working chamber C as this moves into position directly opposite lobe 33 and with the rotor 12 rotated 60° about its axis 32 as well as being revolved by swinging the rotor axis 32 90° upwardly about the axis 16 of housing 11.

It is thus to be seen that with each complete revolution of the rotor 12, each of the working chambers A, B and C will entertain two power impulses, one from the fuel-charge-delivery-and-ignition-head 42 and the other from similar head 43. This makes a total of six power impulses produced by the engine 10 for each revolution of the rotor 12. As the shaft 19 makes three revolutions for each two revolutions of the rotor 12, the engine 10 produces four power impulses for each revolution of the shaft.

It is manifest, from an inspection of the right portion of FIG. 2, that each seal means 40, (comprising two seal vanes 41) enters into a sealing relation with each of the lobes 33 and 34 as it approaches said lobe and remains in such relation until after the center of said seal means has travelled a substantial distance past the center of said lobe. The resulting division of the adjacent operating chamber into subchambers $S_1$ and $S_2$ is thus in effect during the entire period within which a fuel charge is being delivered to said subchamber $S_1$ and during the firing of this charge. In fact, by the time said seal means is withdrawn from sealing relation with said lobe, subchamber $S_2$ has become contracted in volume and diminished in length to where there is only a minimal space left in it into which the expanding gases of combustion in subchamber $S_1$ can escape rearwardly. It is of no moment therefore that the seal means 40 is not retained in sealing relation with the internal periphery 31 except during that critical portion of each power impulse, in which it performs the function above described.

To facilitate varying the capacities of the respective subchambers $S_1$ for receiving fuel in each charge delivered thereto under a predetermined pressure, the leading half of each of the rotor faces $a$, $b$ and $c$ may have a pocket $p$ provided therein to uniformly supplement the volumetric capacity of said subchambers.

I claim:

1. A rotary internal combustion engine comprising:
   an outer body having spaced end walls and a peripheral wall interconnecting said end walls to define a cavity having an axis normal to said end walls, the inner surface of said peripheral wall having basically the profile of a multi-lobed epitrochoid with its lobes being spaced circumferentially about said axis;
   an inner body received within said outer body cavity and supported for rotation with respect to said outer body with the axis of said inner body laterally spaced from, but parallel to the axis of said outer body cavity, parallel end faces of said inner body having sealing engagement with end walls of said cavity, the periphery of said inner body having circumferentially spaced apex portions, one more in number than said lobes, each of said apex portions having continuous sealing engagement with said peripheral wall of said outer body to divide the space between said inner and outer bodies into a plurality of working chambers which progressively increase and decrease in volume upon relative rotation of the inner body with respect to the outer body, each working chamber extending from one of said apex portions to another adjacent apex portion in all relative positions of the two bodies;
   means for momentarily sealing off a trailing portion of each working chamber from a leading portion thereof approximately at the moment of each maximum contraction of said working chamber;
   means for delivering a timely charge of compressed fuel exclusively to said leading portion of each working chamber while it is sealed off from the trailing portion thereof;

ignition means for igniting each such charge, to produce a power impulse; and exhaust passage means opening into said space for sequentially and individually exhausting combustion gases from said working chambers at the conclusion respectively of the power impulses taking place in these.

2. A rotary internal combustion engine as recited in claim 1 in which the surface of the periphery of said inner body disposed between an adjacent pair of said apex portions is convex in shape whereby a central portion of said surface is juxtaposed close to one of said lobes in the internal peripheral surface of said outer body at the moment of maximum contraction of the working chamber formed by said surface;

auxiliary seal means co-extensive lengthwise with said inner body and embodied therewith so as to divide said outer surface and extend therefrom into yieldable sealing relation with said lobe for a short period of time including said moment of maximum contraction of said working chamber so as to divide the latter temporarily into two subworking chambers during the delivery of a charge of fuel to said leading portion of said working chamber and the firing of the same.

3. A rotary internal combustion engine as recited in claim 2 in which said auxiliary co-extensive seal means comprises:

a plurality of seal members retractably and extensively slideably mounted in said outer surface of said inner body for a limited degree of extension from said surface and readily susceptible to pressure thereagainst upon said seal members contacting the inner peripheral surface of said outer body and said lobe so that said seal members sealingly conform to said peripheral surface and said lobe for said limited period of time as aforesaid to effect a seal between said inner body and said outer body dividing said working chamber momentarily into two subchambers as aforestated.

* * * * *